United States Patent [19]
Watanabe

[11] Patent Number: 5,272,537
[45] Date of Patent: Dec. 21, 1993

[54] SOLID STATE IMAGING DEVICE FOR OBTAINING NORMAL AND MIRROR IMAGES FROM A SINGLE OUTPUT

[75] Inventor: Takashi Watanabe, Soraku, Japan

[73] Assignee: Sharp Kabushiki Kaisha, Osaka, Japan

[21] Appl. No.: 738,317

[22] Filed: Jul. 31, 1991

[30] Foreign Application Priority Data

Oct. 6, 1989 [JP] Japan .................... 1-262625

[51] Int. Cl.$^5$ .............. H04N 3/14; H04N 5/335
[52] U.S. Cl. .................... 358/213.23; 358/213.29; 257/240; 257/241; 257/249
[58] Field of Search .......... 358/213.23, 213.26, 358/213.29, 213.31; 257/231, 240, 241, 246, 249

[56] References Cited

U.S. PATENT DOCUMENTS

| | | | |
|---|---|---|---|
| 4,127,877 | 11/1978 | Morishita et al. | 257/231 |
| 4,230,952 | 10/1980 | Knauer | 257/240 |
| 4,403,237 | 9/1983 | Ohkubo et al. | 257/240 |
| 4,816,918 | 3/1989 | McGrath | 358/213.23 |
| 4,897,728 | 1/1990 | Yamada | 358/213.23 |
| 5,148,013 | 9/1992 | Yamada | 358/213.23 |

FOREIGN PATENT DOCUMENTS

| | | | |
|---|---|---|---|
| 1302974 | 12/1989 | Japan. | |
| 3123278 | 5/1991 | Japan | 5/335 |

OTHER PUBLICATIONS

Miyatake, S. et al., "A CCD Image on Three Types of P. Wells" *Japanese Journal of Applied Physics* 24(5) May 1985 pp. 574–579.

Ishibara, Y. et al., "Interline CCD Image Sensor With an Antiblooming Structure" *IEEE Transactions on Electron Devices*, ED-31(1), Jan. 1984, pp. 83–88.

Akimoto, H. et al., "Reverse Scanning System for Color Video Signal", National Congress of the Institute of Television, 1989 and a translation of the introduction.

*Primary Examiner*—Joseph Mancuso
*Assistant Examiner*—Wendy R. Greening
*Attorney, Agent, or Firm*—David G. Conlin; Robert F. O'Connell

[57] ABSTRACT

In a solid state imaging device, a horizontal transfer unit has first and second transfer paths which are disposed in parallel and in which the transfer direction of image signals is changed according to the mode of a driving signal applied to the paths. One end of the first transfer paths is connected to one end of the second transfer path through a third transfer path. When a driving signal of a first mode is applied, the first path transfers image signals from the one end to the other end to output normal image signals. When a driving signal of a second mode is applied, the first path transfers image signals from the other end to the one end to transfer the image signals to the second transfer path via the third transfer path, and the second transfer path transfers image signals from the one end to the other end to output mirror image signals.

6 Claims, 4 Drawing Sheets

SOLID STATE IMAGING DEVICE FOR OBTAINING NORMAL AND MIRROR IMAGES FROM A SINGLE OUTPUT

BACKGROUND OF THE INVENTION

1. Field of the Invention

This invention relates to a solid state imaging device such as a CCD imager, and more particularly to a solid state imaging device from which both normal image signals and mirror image signals can be selectively obtained.

2. Description of the Prior Art

There are two known methods of obtaining mirror image signals from a two-dimensional solid-state imaging device by purely electronic processing:

(1) by providing one additional line memory and reversing the sequence of image signals for one horizontal scanning line in the additional line memory; and (2) by reversing the direction of the horizontal scanning in the solid state imaging device when reading out image signals.

Among these two methods, method (1) is not advantageous because it involves an increase in the size of the circuitry around the imaging device and tends to cause problems such as degradation of the S/N ratio, etc.

The following description deals with method (2), taking for example a CCD imager which is the most commonly used solid state imaging device. In the following discussion, an interline transfer CCD imager is taken for example, but it should be appreciated that the discussion is also applicable to a frame transfer CCD imager in exactly the same way. FIG. 4 shows an interline transfer CCD imager in which the method (2) is employed. The interline transfer CCD imager of FIG. 4 comprises: photoelectric converting elements (pixels) $a_{ij}$ arranged in a 4×4 matrix; a vertical CCD array 41 which transfers signals received from the pixels $a_{ij}$, in the vertical direction in accordance with vertical clock signals $\phi_{V1}$, $\phi_{V2}$, $\phi_{V3}$ and $\phi_{V4}$; a horizontal CCD array 42 which transfers signals received from the vertical CCD array 41, in the horizontal direction according to horizontal clock signals $\phi_{H1}$, $\phi_{H1}'$, $\phi_{H2}$ and $\phi_{H2}'$; a first signal charge detector A1 disposed at the left end of the horizontal CCD array 42; and a second signal charge detector A2 disposed at the right end of the horizontal CCD array 42. In this configuration, when the timing of the horizontal clock signals $\phi_{H1}-\phi_{H2}'$ is set to a first driving mode to provide right-to-left transfer directionality to the horizontal CCD array 42, an output signal OS is obtained from the first signal charge detector A1 to form normal image signals. In contrast, when the timing of the horizontal clock signals $\phi_{H1}-\phi_{H2}'$ is set to a second driving mode (in which the phase is shifted by 180° with respect to that in the first driving mode) to provide left-to-right transfer directionality to the horizontal CCD array 42, an output signal OS' is obtained from the second signal charge detector A2 to form mirror image signals. Such a solid state imaging device is disclosed, for example, in Japanese Patent Publication (Kokai) No. 1-302974.

The above-described configuration has the following drawbacks.

(A) Because of a difference in characteristics between the signal charge detectors A1 and A2, there occurs a variation in the picture quality between the resulting normal and mirror images.

(B) It requires the provision of two separate output circuits which makes the configuration of an external signal processing system complex.

(C) Since two sets of output circuits are required, the number of output terminals is twice as many as compared with a conventional CCD imager.

(D) In order to reduce the power consumption it is necessary to provide an external power switching circuit or the like.

SUMMARY OF THE INVENTION

The solid state imaging device of this invention, which overcomes the above-discussed and numerous other disadvantages and deficiencies of the prior art, comprises: photoelectric conversion means for generating image signals; vertical transfer means, connected to said photoelectric conversion means, for transferring the image signals; horizontal transfer means, connected to said vertical transfer means, for transferring the image signals in accordance with a driving signal, said driving signal being externally supplied to said horizontal transfer means; and signal detection means, connected to said horizontal transfer means, for receiving the image signals from said horizontal transfer means, said horizontal transfer means comprising: a first transfer path; a second transfer path; and a third transfer path for connecting one end of said first transfer path to one end of said second transfer path, the other ends of said first and second transfer paths being connected to said signal detection means.

In a preferred embodiment, said driving signal has first and second modes, when said driving signal is in said first mode, said first transfer path transfers the image signals in a direction from said one end of said first transfer path to said other end of said first transfer path, and when said driving signal is in said second mode, said first transfer path transfers the image signals in a direction from said other end of said first transfer path to said one end of said first transfer path, said third transfer path transfers the image signals in a direction from said one end of said first transfer path to said one end of said second transfer path, and said second transfer path transfers the image signals in a direction from said one end of said second transfer path to said other end of said second transfer path.

In a preferred embodiment, a plurality of electrodes are arranged over said horizontal transfer means, said driving signal being applied to said first to third paths path through said electrodes.

In a preferred embodiment, the arrangement of said electrodes over said first path is different from that of said electrodes over said second path, thereby changing transfer directions of said first and second paths from each other.

In a preferred embodiment, said third transfer path has an arc-like shape in a plan view.

In a preferred embodiment, said transfer means further comprises a fourth transfer path which is disposed between the other ends of said first and second transfer paths and said signal detection means.

Thus, the invention described herein makes possible the objectives of:

(1) providing a solid state imaging device which can output both normal image signals and mirror image signals from single output circuit;

(2) providing a solid state imaging device which can output both normal image signals and mirror image signals without increasing the number of output terminals; and (3) providing a solid state imaging device which can output both normal image signals and mirror image signals without increasing the power consumption.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1A:
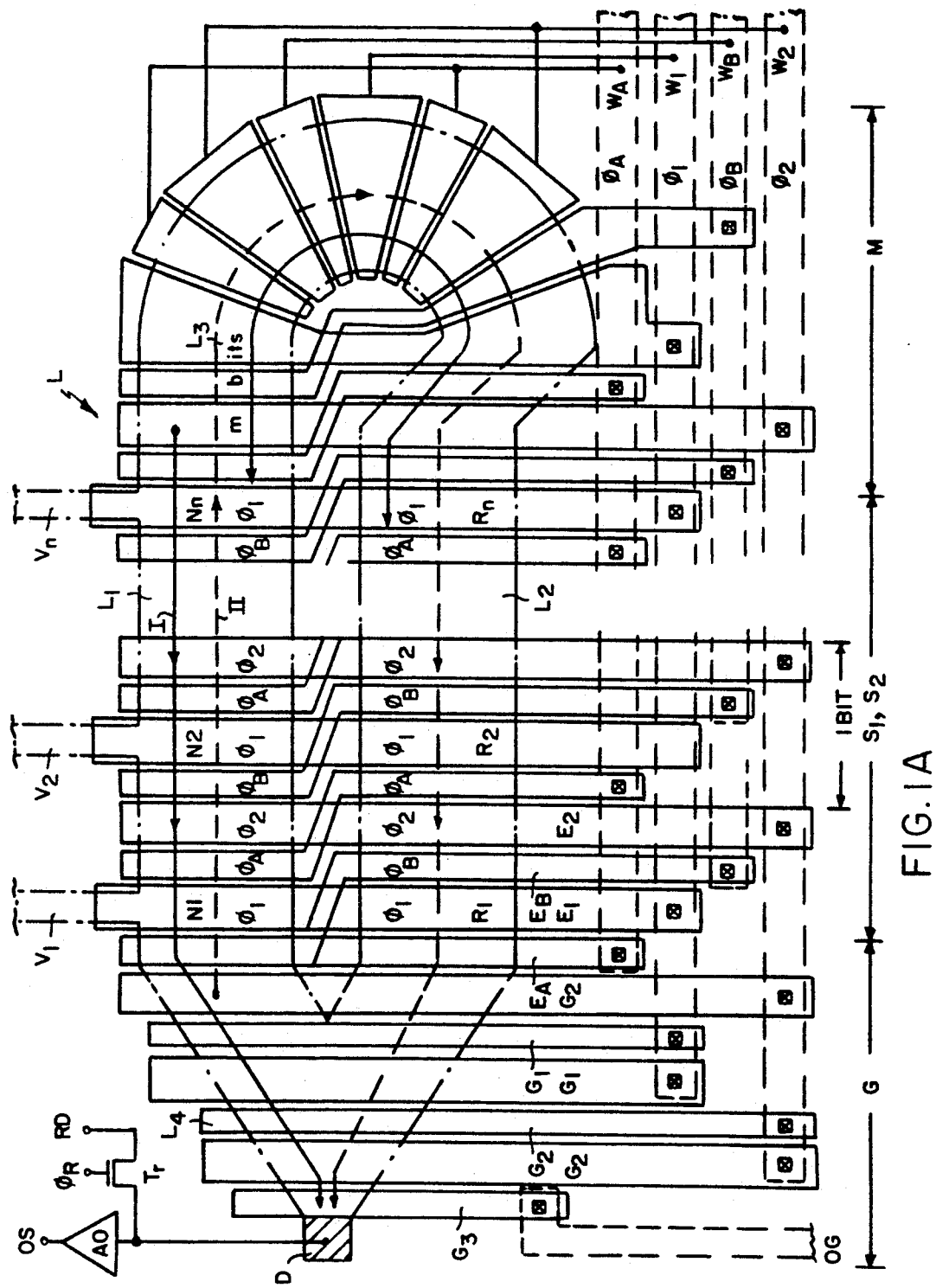
FIG. 1A is a diagram illustrating main portions of a solid state imaging device according to the invention.
Figure 4:
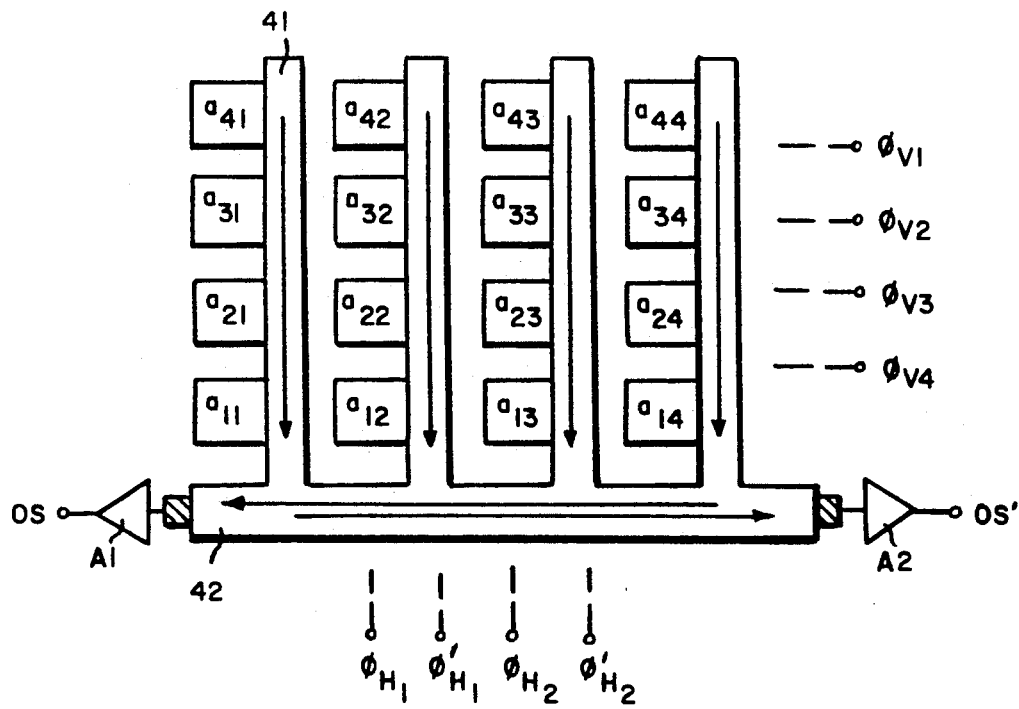
FIG. 4 is a diagram illustrating a prior art solid state imaging device which can output both normal and mirror image signals.

FIG. 1A illustrates an embodiment of the invention. The embodiment of FIG. 1A is an interline transfer CCD imager, and comprises photoelectric converting units, vertical transfer units, and a horizontal transfer unit L. The photoelectric converting units and vertical transfer units may be structured in the same manner as shown in FIG. 4, and therefore they are not shown in FIG. 1A, and their description is omitted. Outputs $V_1$—$V_n$ of the vertical transfer units are supplied to the horizontal transfer unit L.

In FIG. 1A, the region indicated by one-dot chain lines is an active region which constitutes a CCD transfer channel, and channel stop regions (not shown) are formed outside the CCD transfer channel. The CCD transfer channel comprises first to fourth transfer paths $L_1$ to $L_4$. The first and second transfer paths $L_1$ and $L_2$ are disposed in parallel. One end of the first transfer path $L_1$ is connected to one end of the second transfer path $L_2$ through the third transfer path $L_3$ which has an arc-like shape in a plan view as shown in FIG. 1A. The other ends of the first and second transfer paths $L_1$ and $L_2$ are commonly connected to the fourth transfer path $L_4$.

Figure 1B:
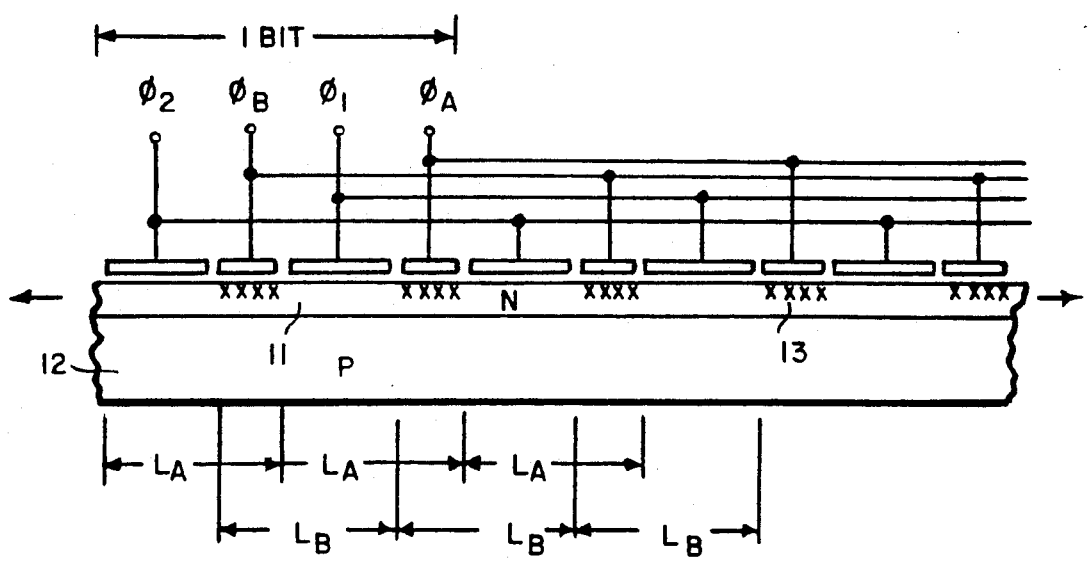
FIG. 1B shows a sectional view of the horizontal transfer unit used in the device of FIG. 1A.

On the CCD transfer channel, transfer electrodes $E_A$, $E_B$, $E_1$, $E_2$, and $G_1$-$G_3$ (solid lines) are arranged. More specifically, the transfer electrodes $E_A$, $E_B$, $E_1$ and $E_2$ are formed over the first the to third paths $L_1$-$L_3$, and the transfer electrodes $G_1$-$G_3$ transfer paths $L_1$-$L_3$, and the transfer electrodes $G_1$-$G_3$ over the fourth transfer path $L_4$. These electrodes are disposed on an $N^-$-layer 11 formed in the surface of a P-substrate 12 as shown in FIG. 1B. The narrower electrodes $E_A$ and $E_B$ are upper electrodes, and the wider electrodes $E_1$ and $E_2$ are lower electrodes. While the edges of the upper electrodes $E_A$ and $E_B$ overlap the lower electrodes $E_1$ and $E_2$, for the sake of simplicity, the upper and lower electrodes are shown separated from each other in the figures. P-impurities 13 are injected in the surface regions of the $N^-$-layer 11 below the narrower electrodes $E_A$ and $E_B$, thereby providing the directionality of image signal transfer. One set of two adjacent upper electrodes $E_A$ and $E_B$ and two adjacent lower electrodes $E_1$ and $E_2$ constitute one bit. The transfer electrodes $G_1$-$G_3$ are constructed in the same manner as the transfer electrodes $E_A$-$E_2$. In this embodiment, the third transfer path $L_3$ comprises 16 transfer electrodes $E_A$-$E_2$ in total to have the length corresponding to 4 bits (m=4).

The transfer electrodes $E_A$-$E_2$ arranged above the first to third transfer paths $L_1$ to $L_3$ constitute a first horizontal transfer electrode group $S_1$, a second horizontal transfer electrode group $S_2$ and an interconnecting transfer electrode group M, respectively. The transfer electrodes $G_1$-$G_3$ constitute a signal charge detection electrode group G. The interconnecting transfer electrode group M connects the first horizontal transfer electrode group $S_1$ with the second horizontal transfer electrode group $S_2$. As shown in FIG. 1A, the transfer electrodes $E_A$-$E_2$ are common both in the first and second horizontal transfer electrode groups $S_1$ and $S_2$, but the sequence of the transfer electrodes $E_A$-$E_2$ in the first horizontal transfer electrode group $S_1$ is different from that in the second horizontal transfer electrode group $S_2$, so that the transfer directions in the first and second transfer paths $L_1$ and $L_2$ are opposite each other.

The transfer electrode groups $S_1$, $S_2$, M and G receive via contact holes clock signals $\phi_A$, $\phi_B$, $\phi_1$ and $\phi_2$ from metal wirings $W_A$, $W_B$, $W_1$ and $W_2$ which are shown by broken lines in FIG. 1A. Namely, the clock signals $\phi_A$ and $\phi_B$ are applied to the transfer electrodes $E_A$ and $E_B$, respectively, the clock signal $\phi_1$ is applied to the transfer electrodes $E_1$ and $G_1$, and the clock signal $\phi_2$ is applied to the transfer electrodes $E_2$ and $G_2$. A DC voltage OG is applied to the transfer electrode $G_3$.

Figure 2A:
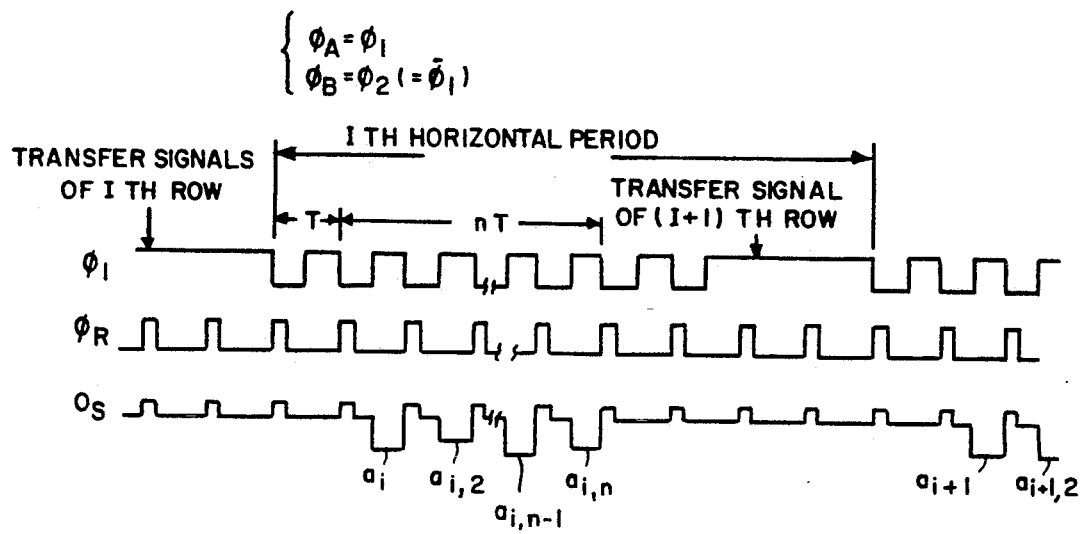
FIG. 2A is a timing chart illustrating the operation of the device of FIG. 1A in the normal image mode.
Figure 2B:
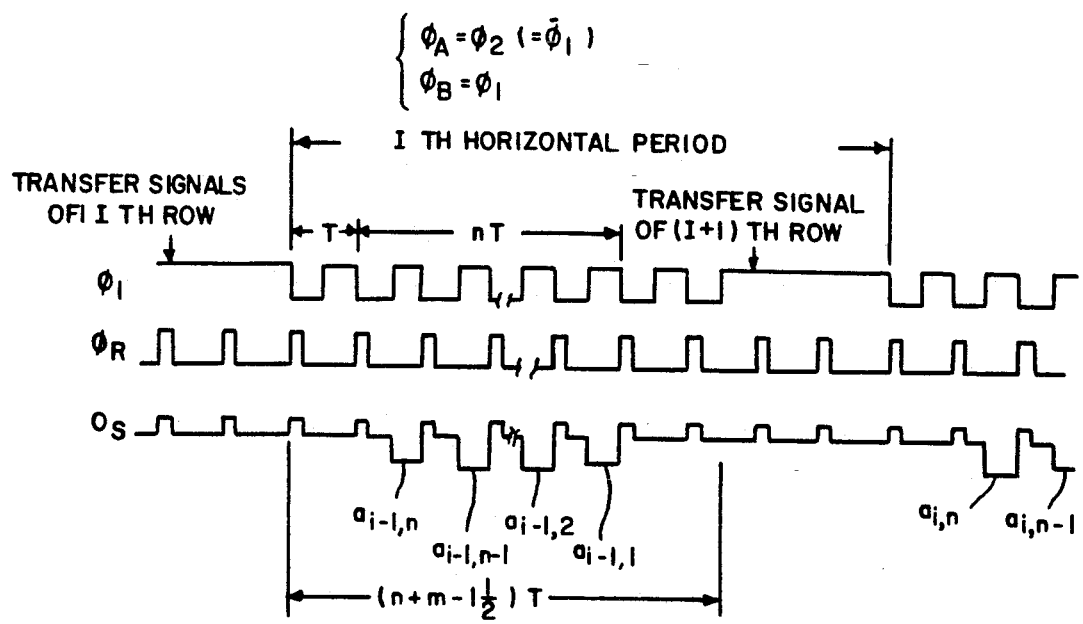
FIG. 2B is a timing chart illustrating the operation of the device of FIG. 1A in the mirror image mode.

The output of a junction diode D which is adjacent to the transfer electrode $G_3$ is supplied to an amplifier $A_0$. The potential of the output of the diode D is reset to a reset potential RD by a reset signal $\phi_R$ which is supplied to the gate of a transistor Tr. The reset signal $\phi_R$ rises at the falling edges of the clock signal $\phi_1$ as shown in FIGS. 2A and 2B. The potential variation in the output of the diode D is amplified by the amplifier $A_0$ to be outwardly supplied as an output OS.

Below the transfer electrodes $E_A$ and $E_B$ and narrow ones of the transfer electrodes $G_1$ and $G_2$, potential barriers are formed in order to provide the directionality of image signal transfer. The outputs $V_1$-$V_n$ of the vertical transfer units are applied to the first transfer path $L_1$.

When the modes of the clock signals is set to a first driving mode (normal mode) (i.e., the clock signals $\phi_A$ and $\phi_1$ are identical with each other ($\phi_A=\phi_1$), and the clock signals $\phi_B$ and $\phi_2$ are identical with each other and the inversion of the clock signal $\phi_1$ ($\phi_B=\phi_2=\overline{\phi_1}$)), image signals are transferred in the first direction indicated by a solid arrow line I in FIG. 1A. In this case, the diode D outputs image signals in the sequence of $V_1$, $V_2$, ..., $V_n$ to provide normal image signals. In contrast, when the modes of the clock signals is set to a second driving mode (mirror image mode) (i.e., the clock signals $\phi_A$ and $\phi_2$ are identical with each other and the inversion of the clock signal $\phi_1$ ($\phi_A=\phi_2=\overline{\phi_1}$) and the clock signals $\phi_B$ and $\phi_1$ are identical with each other ($\phi_B=\phi_1$)), image signals are transferred in the second direction indicated by a broken arrow line II in FIG. 1A. In this case, the diode D outputs image signals in the sequence of $V_n, V_{n-1}, \ldots, V_1$ to provide mirror image signals.

FIGS. 2A and 2B illustrate the potential variations of the clock signal $\phi_1$, the reset signal $\phi_R$ and the output OS in the first and second driving modes, respectively. First, the operation in the first driving mode will be described. Before the ith horizontal scanning period, image signals of the ith row of the pixels $a_{i,1}, a_{i,2}, \ldots, a_{i,n-1}, a_{i,n}$ are respectively transferred to regions $N_1, N_2, \ldots, N_{n-1}, N_n$ of the first transfer path $L_1$. During the ith horizontal scanning period, then, image signals of the ith pixel row $a_{i,1}, a_{i,2}, \ldots, a_{i,n-1}, a_{i,n}$ are transferred in the first transfer path $L_1$ along the first direction I, and sequentially output in this order as the output signal OS, thereby providing normal image signals for the ith pixel row. This horizontal transfer requires a period of time nT (T is a period for transferring one bit). Thereafter, image signals of the (i+1)th row of the pixels are transferred to the first transfer path $L_1$ to repeat the above-described procedures.

When the clock signals are operated in the second driving mode, in contrast, image signals of the (i−1)th pixel row $a_{i-1,n}, a_{i-1,n-1}, \ldots, a_{i-1,2}, a_{i-1,1}$ are output in this order as the output signal OS during the ith horizontal scanning period. More specifically, before the (i−1)th horizontal scanning period, image signals of the (i−1)th pixels row $a_{i-1,1}, a_{i-1,2}, \ldots, a_{i-1,n-1}, a_{i-1,n}$ are respectively transferred to regions $N_1, N_2, \ldots, N_{n-1}, N_n$ of the first transfer path $L_1$. During the (i−1)th horizontal scanning period, image signals of the (i−1)th pixel row $a_{i-1,n}, a_{i-1,n-1}, \ldots, a_{i-1,2}, a_{i-1,1}$ are sequentially transferred along the second direction II in this order from the first transfer path $L_1$ to the second transfer path $L_2$ via the third transfer path $L_3$, and reach the regions $R_1, R_2, \ldots, R_{n-1}, R_n$ of the second transfer path $L_2$ to be accumulated therein, respectively. Then, during the ith horizontal scanning period, image signals of the (i−1)th pixel row $a_{i-1,n}, a_{i-1,n-1}, \ldots, a_{i-1,2}, a_{i-1,1}$ are sequentially output as the output signal OS (i.e., image signals of the (i−1)th pixel row are output in the reversed order) to provide mirror image signals for the (i−1)th pixel row. The timing at which the first image signal for the (i−1)th pixel row (i.e., the nth column pixel $a_{i-1,n}$) is output in the second driving mode can be easily made to coincide with the timing at which the first image signal for the ith pixel row (i.e., the first column pixel $a_{i,1}$) is output in the first driving mode, by adjusting the transfer period of the fourth transfer path $L_4$ in which image signals are transferred from the first or second transfer path $L_1$ or $L_2$ to the diode D in synchronism with the clock signal within one horizontal scanning period, or by adequately setting the length of the third transfer path $L_3$.

As seen from FIG. 2B, when the transfer period is set to $(n+m-3/2) \cdot T$ within one horizontal scanning period (in the embodiment of FIG. 1A, the length of the third transfer path $L_3$ corresponds to 4 bits (i.e., m=4)), immediately after the transfer of signals from the vertical transfer units to the horizontal transfer unit L, the signals $V_1, \ldots, V_n$ are accumulated in the regions $S_1, \ldots, S_n$ in the first driving mode, and the signals $V_n, \ldots, V_1$ are accumulated in the regions $R_1, \ldots, R_n$ in the second driving mode. Therefore, the timing at which the signals $V_1, \ldots, V_n$ are output at the output terminal is the same between the first driving mode (normal mode) and the second driving mode (mirror image mode). However, in the second driving mode, the output of the signals is delayed by one horizontal scanning period.

Although there is a time difference corresponding to one horizontal scanning period between the first driving mode for an normal image and the second driving mode for a mirror image, this delay does not cause any problems because it only appears as a vertical shift of the image by one scanning line on an actual display screen.

Figure 3A:
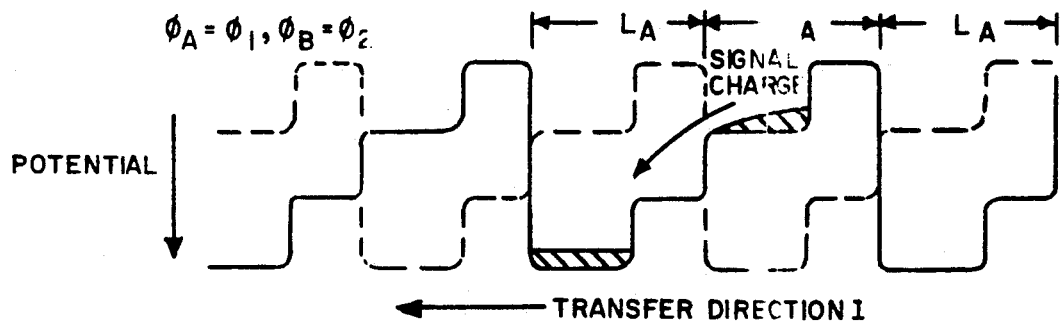
FIG. 3A is a diagram illustrating the potential variations in the horizontal transfer unit in the normal image modes.
Figure 3B:
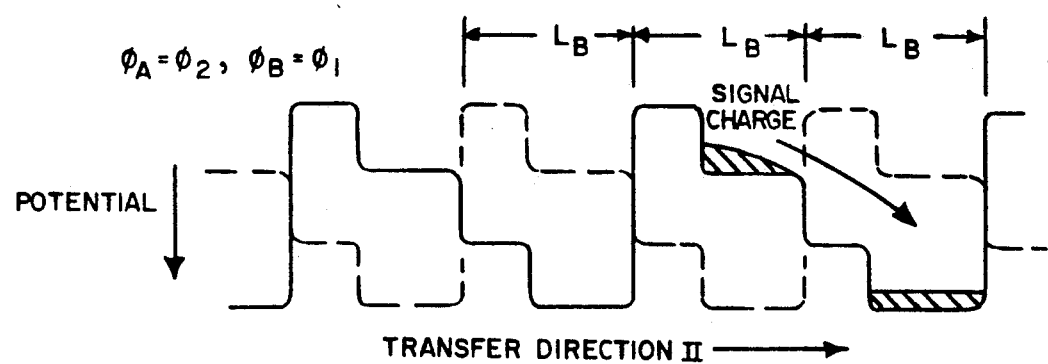
FIG. 3B is a diagram illustrating the potential variations in the horizontal transfer unit in the mirror image modes.

FIGS. 3A and 3B illustrate the potential variations in the horizontal transfer unit shown in FIG. 1B.

FIG. 3A illustrates the potential variation when the clock signal potentials such that $\phi_A = \phi_1$, $\phi_B = \phi_2$ are applied to the gate input terminals shown in FIG. 1B. Each portion indicted by a gate length $L_A$ in FIG. 1B works as a gate. The phases of clock signals $\phi_1$ and $\phi_2$ are inverse each other ($\phi_1 = \overline{\phi_2}$). The solid line indicates a potential variation when $\phi_1$=Low and $\phi_2$=High. The broken line indicates a potential variation when $\phi_1$=High and $\phi_2$=Low. Thus, when the two phase clock signal potential as shown in FIG. 2A is applied to the device, the signal charge in CCD is transferred to the left side (i.e. in TRANSFER DIRECTION I) one after another as shown in FIG. 3A.

FIG. 3 illustrates the potential variation when the clock signal potentials such that $\phi_A = \phi_2$, $\phi_B = \phi_1$ are applied to the gate input terminals shown in FIG. 1B. Each portion indicated by a gate length $L_B$ in FIG. 1B works as a gate. The phases of clock signals $\phi_1$ and $\phi_2$ are inverse of each other ($\phi_1 = \overline{\phi_2}$). The solid line indicates a potential variation when $\phi_1$=Low and $\phi_2$=High. The broken line indicates a potential variation when $\phi_1$=High and $\phi_2$=Low. Thus, when the two phase clock signal potential as shown in FIG. 2B is applied to the device, the signal charge in CCD is transferred to the right side (i.e., the TRANSFER DIRECTION II) one after another as shown in FIG. 3B.

As described above, according to the present invention, the external driving timing of the solid state imaging device is switched between two modes so that a video signal for an normal image or a mirror image, whichever selected, can be obtained from the same output terminal, thus providing a significant functional advantage. Furthermore, despite the addition of this great advantage, the present imaging device hardly requires an increased number of output terminals and does not entail an increase in power consumption.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A solid state imaging device comprising:
    photo-electric conversion means for generating image signals;
    vertical transfer means, connected to said photo-electric conversion means, for transferring the image signals;
    horizontal transfer means, connected to said vertical transfer means, for transferring the image signals in accordance with a driving signal, said driving signal being externally supplied to said horizontal transfer means; and signal detection means, connected to said horizontal transfer means, for receiving the image signals from said horizontal transfer means, said horizontal transfer means comprising:

a first transfer path;

a second transfer path; and a third transfer path for connecting one end of said first transfer path to one end of said second transfer path, the other ends of said first and second transfer paths being connected to said signal detection means.

2. A solid state imaging device according to claim 1, wherein said driving signal has first and second modes, when said driving signal is in said first mode, said first transfer path transfers the image signals in a direction from said one end of said first transfer path to said other end of said first transfer path, and when said driving signal is in said second mode, said first transfer path transfers the image signals in a direction from said other end of said first transfer path to said one end of said first transfer path, said third transfer path transfers the image signals in a direction from said one end of said first transfer path to said one end of said second transfer path, and said second transfer path transfers the image signals in a direction from said one end of said second transfer path to said other end of said second transfer path.

3. A solid state imaging device according to claim 1, wherein a plurality of electrodes are arranged over said horizontal transfer means, said driving signal being applied to said first to third paths through said electrodes.

4. A solid state imaging device according to claim 3, wherein the arrangement of said electrodes over said first path is different from that of said electrodes over said second path, thereby changing transfer directions of said first and second paths from each other.

5. A solid state imaging device according to claim 1, wherein said third transfer path has an arc-like shape in a plan view.

6. A solid state imaging device according to claim 1, wherein said horizontal transfer means further comprises a fourth transfer path which is disposed between the other ends of said first and second transfer paths and said signal detection means.

* * * * *